Figure 1:
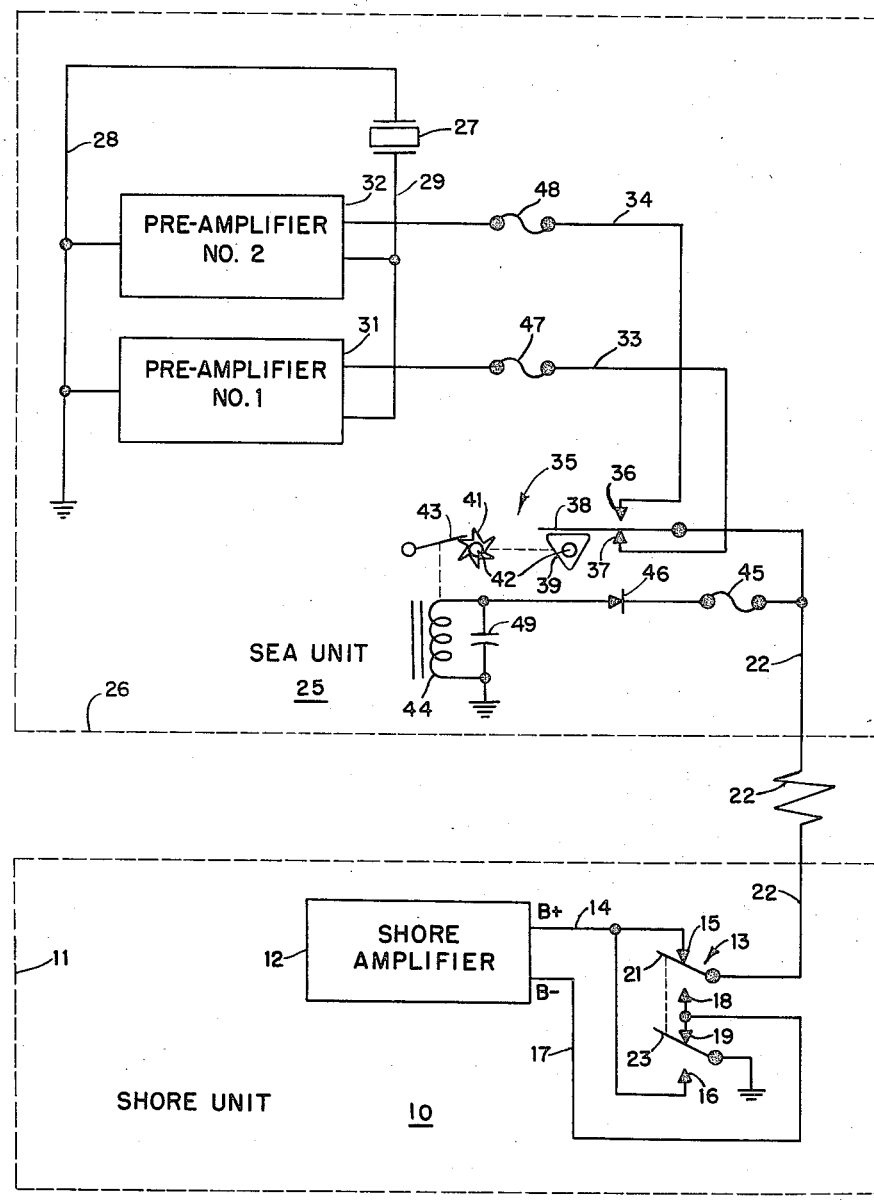

July 1, 1958 — Z. H. BLANKERS — 2,841,776
SHORE-CONTROLLED METHOD AND SYSTEM OF PREAMPLIFIER EXCHANGE
Filed April 6, 1953 — 2 Sheets-Sheet 1

INVENTOR.
ZEGER H. BLANKERS
BY
ATTORNEYS

2,841,776

SHORE-CONTROLLED METHOD AND SYSTEM OF PREAMPLIFIER EXCHANGE

Zeger H. Blankers, San Diego, Calif.

Application April 6, 1953, Serial No. 347,191

10 Claims. (Cl. 340—4)

(Granted under Title 35, U. S. Code (1952), sec. 266)

The invention described herein may be manufactured and used by or for the Government of the United States of America for governmental purposes without the payment of any royalties thereon or therefor.

This invention relates generally to harbor defense systems and more particularly to a shore-controlled method and system of preamplifier exchange for sonar equipments employed in harbor defense.

Most sonar equipment operated from shore incorporates a preamplifier-hydrophone sea unit which is electrically connected to the shore equipment by submarine conductors. The preamplifier employed in this prior art unit is usually of high-quality and contains many components liable to early failure which heretofore has required resurfacing of the sea unit for repair. Such a condition of maintenance of the equipment in service has generally been found to be undesirable for the reasons that surfacing techniques are usually time consuming, costly, and require considerable manpower.

According to the shore-controlled method and system of preamplifier exchange of the present invention, the undesirable maintenance condition of the prior art sonar equipment is substantially obviated by provision of a sea unit having one or more spare or stand-by preamplifiers arranged to be switched, selectively, into operative circuit relation to the hydrophone and shore equipment in lieu of the defective preamplifier under control of relay or stepper switch means operable from shore, this being accomplished by the specific method and means hereinafter more fully to be described as the specification proceeds.

One object of the present invention therefore is to provide a method and apparatus for repairing submerged sonar equipment through shore control to thereby obviate the need, otherwise required, for surfacing the equipment for such repair.

Another object is to repair the submerged equipment by provision of spare preamplifiers and selective substitution, through shore control, of one of the spare preamplifiers for the one operatively connected in the circuit of the sonar system.

A further object is to accomplish the shore-controlled preamplifier exchange without requiring additional submarine conductors.

A still further object is to effect the aforementioned shore-controlled preamplifier exchange by reversing the polarity of the supply voltage for the submerged sonar equipment.

Figure 2:
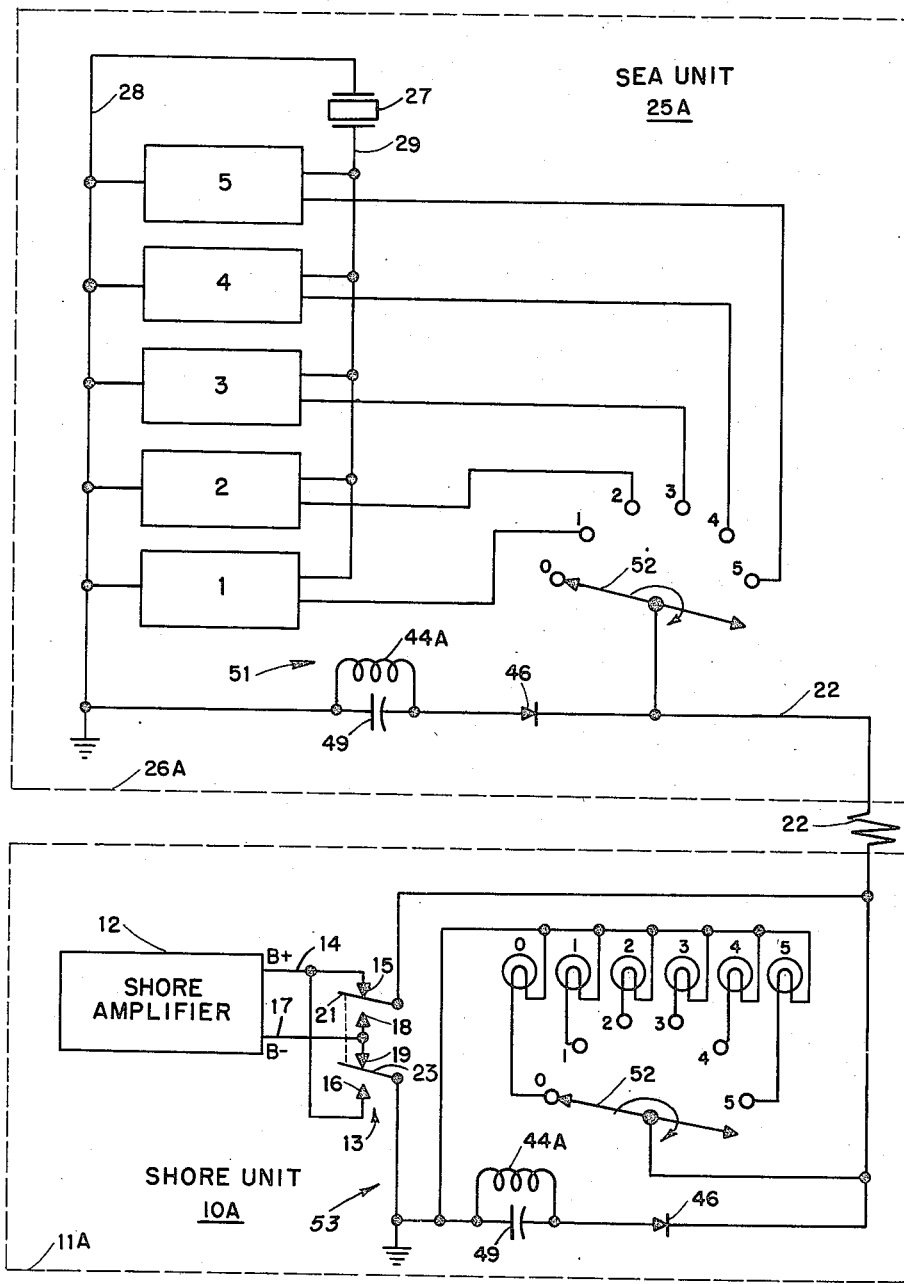

Other objects and many of the attendant advantages of this invention will be readily appreciated as the same becomes better understood by reference to the following detailed description when considered in connection with the accompanying drawings wherein:

Fig. 1 is a diagrammatic view of the electrical system of the present invention according to one embodiment thereof; and Fig. 2 is a diagrammatic view of an alternative embodiment.

Referring now to the drawings for a more complete understanding of the invention and more particularly to Fig. 1 thereof, the shore unit or equipment 10 is disclosed as an entity enclosed by the dashed line 11 and comprises a shore amplifier 12 and a switch generally designated 13.

B+ potential from the amplifier is applied by way of conductor 14 to fixed contacts 15 and 16 of the switch and B− potential from the amplifier on conductor 17 is applied to the connected fixed contacts 18 and 19 of the switch. Arm 21 of the switch is normally positioned in engagement with contact 15 to apply B+ potential to the single submarine conductor 22 which also serves as the signal and filament supply. Arm 23 of the switch is ganged to arm 21 and connected to ground potential, as illustrated.

The submarine conductor 22 extends to the sea unit 25 which is disclosed as an entity enclosed by the dashed line 26. The sea unit comprises a hydrophone 27 which is grounded on one side through the conductor 28 and on the other side connected by conductor 29 to two preamplifiers 31 and 32, these also being grounded through conductor 28.

The preamplifiers 31, 32 are connected by way of conductors 33, 34 respectively to a ratchet type relay generally designated 35, these conductors being connected to the fixed contacts 36, 37 of the relay. The movable contact 38 of the relay is arranged to engage contacts 36, 37 alternately upon step-by-step rotational movement of the three point cam 39, the movable contact being in engagement with contact 37 when the cam is in the position illustrated in Fig. 1. When the cam is rotated sixty degrees from this position, movable contact 38 is disengaged from contact 37 and is forcibly urged into engagement with contact 36 by movement of one of the points of the cam against the movable contact.

The sixty degree movement of cam 39 is accomplished by the step-by-step movement of the six tooth ratchet wheen 41 which is fixed for rotation with the cam, being mounted therewith on the same shaft 42. The ratchet wheel, in turn, is driven through the sixty degree movement by the relay armature 43 upon movement thereof in response to energization of relay coil 44, all in a manner and by use of specific relay structure well known in the art of ratchet type relays.

The submarine conductor 22 is connected to movable contact 38 and, accordingly, B+ potential on conductor 22 is supplied to one or the other of preamplifiers 31, 32 depending on which the 36, 37 is engaged by contact 38.

Conductor 22 is also connected to a fuse 45. Interconnected between fuse 45 and relay coil 44 is a rectifier 46, preferably a selenium rectifier, which is so arranged as to present a high resistance to B+ potential on conductor 22 such that the B+ potential on the ungrounded side of relay coil 44 is so much less than the minimum operating potential of the relay as to prevent operation thereof as long as conductor 22 carries B+ potential. When switch 13 is moved to engage contacts 16 and 18, however, such that the B+ conductor 14 is grounded and negative potential is applied to submarine conductor 22, rectifier 46 presents negligible resistance to B+ potential applied through ground to relay coil 44 and consequently sufficient current flows therethrough to actuate the relay.

Fuse 45 in the relay circuit and fuses 47 and 48 in the preamplifier circuits are employed for protection against short circuits. Otherwise, a short circuit in a preamplifier could render the ratchet relay inoperable and, conversely, a short in the relay could render the preamplifiers inoperative. A capacitor 49 is required across the terminal of coil 44 to prevent harmful transient effects.

When a capacitor is connected in series with a low impedance in the preamplifier circuit, the use of a nonpolarized capacitor is preferred. Otherwise, if a polarized capacitor is used, it may be burned out by the momentary reverse polarity applied for actuation of relay 35. When use of the polarized capacitors is desired, the burned out condition may be avoided by inserting rectifiers in the preamplifier supply lines 33 and 34 respectively, as will be readily understood by those skilled in the art.

In the operation of the preamplifier exchange thus far described, it may be assumed that the sonar equipment when set up for use has the relay 35 and the switch 13 in the positions illustrated in Fig. 1 such that preamplifier 31 is activated by B+ potential from conductor 22 for response to signals received from the hydrophone 27, and the preamplified signals are transmitted via conductor 22 for further amplification by the shore amplifier 12.

Assuming after an interval of operation that preamplifier 31 fails, it merely is necessary to move arms 21, 23 of switch 13 momentarily into engagement with contacts 18 and 19 thereof respectively to actuate relay 35, as aforedescribed. When this occurs, i. e., during momentary engagement of switch 13 in the moved position, movable contact 38 of the relay is moved to disconnect preamplifier No. 1 from conductor 22 and, in lieu thereof, to connect preamplifier No. 2 to the conductor. Although operation of switch 13 is momentary and is returned to the position illustrated, relay 35 by reason of its ratcheting nature retains contact 38 in its moved position and, thus, the preamplifiers are permanently exchanged.

When it is desired to use preamplifiers requiring individual conductors for the signal, filament, and B+ supply, it merely is necessary to provide additional contact assemblies on the ratchet relay, the relay actuation being accomplished, as before, by reversing the polarity of the B+ supply. For low-level switching, use of hermetically sealed relays with wiping type contacts is recommended to prevent contact noise.

In the sonar equipment illustrated in Fig. 2, the sea unit 25A represents a modification of the sea unit 25 of Fig. 1 in that five preamplifiers are employed, as indicated by the designations 1 to 5, and a stepping type switch, generally designated 51, in employed to transfer B+ potential on conductor 22 to the preamplifiers in sequential order as the wiper 52 of the switch is advanced in successive order to engage the fixed contacts, designated 0 to 5, of the switch contact bank, these contacts being connected respectively, to the correspondingly numbered preamplifiers.

Stepper switch 51 may be of any well known type which operates to advance the wiper 52 ahead one step on the contact bank in response to deenergization of the coil.

The shore unit 10A represents a modification of shore unit 10 of Fig. 1 in that a stepper switch generally designated 53 and identical to switch 51 is added thereto together with a bank of indicator lamps designated 0 to 5. Coil 44A of switch 53 in series with its rectifier 46 is connected in parallel with the operating circuit of switch 51 between conductor 22 and ground. Consequently, wiper 52 of switch 53 is advanced in synchronism with wiper 52 of switch 51 each time switch 13 is closed momentarily.

From the foregoing arrangement it will be understood that all that is necesssary for the purpose of providing a shore-indication of the particular preamplifier which is activated is to insure initial synchronization as to position of the switch wipers, i. e., that both wipers are initially in the same switch position at the time of setting the equipment up for service.

Thus, when both wipers are in the zero or home position, as illustrated, the zero lamp is energized through an obvious circuit and illumination of this lamp indicates that none of preamplifiers 1 to 5 is activated. If, by way of example, it were desired to select preamplifier No. 3 for activation, it merely would be necessary to momentarily close switch 13 a sufficient number of times to cause illumination of lamp No. 3, this being three times with the wipers in the zero position.

By way of summary, it should now be apparent that there has been provided a method of preamplifier exchange which is well adapted to fulfill the aforestated objects of the invention and which generally comprises the steps of operating one of a plurality of submerged preamplifiers on B+ potential supplied from shore while maintaining the remaining preamplifiers in a standby condition, momentarily reversing the polarity of the B+ supply at shore when said one of the preamplifiers fails, and selectively switching one of said standby preamplifiers under power of the reversed polarity supply into operative connection with the B+ supply in lieu of the preamplifier which has failed.

Obviously many modifications and variations of the present invention are possible in the light of the above teachings. It is therefore to be understood that within the scope of the appended claims the invention may be practiced otherwise than as specifically described.

What is desired to be secured by Letters Patent of the United States is:

1. In a harbor defense system, a sea unit comprising a plurality of interchangeable preamplifiers, a single submarine conductor for signal, filament and B+ supply, and means connected to said conductor and responsive only to a momentary change in polarity of the potential of the B+ supply thereon for switching said conductor from one to another of said preamplifiers, a shore unit connected to said submarine conductor and comprising an amplifier for further amplifying preamplified signals received via said conductor, and switching means for momentarily reversing the polarity of the supply potential on said conductor.

2. In a harbor defense system, a plurality of interchangeable preamplifiers, a submarine conductor, normally having shore-supplied B+ potential thereon, means connected to said conductor and responsive only to a momentary change in polarity of the potential thereon for transferring the conductor from one to another of said preamplifiers, and means connected to said conductor at shore for momentarily effecting said change in polarity of the supply potential.

3. In a harbor defense system, a hydrophone, a submarine conductor having shore-supplied B+ potential thereon, a plurality of interchangeable preamplifiers connected to said hydrophone for amplifying signals received therefrom selectively in accordance with the condition of activation of the preamplifiers with respect to said conductor, switch means connected to said conductor and responsive only to momentary reversal of polarity of said supply potential thereon for transferring connection of the conductor from one to another of said preamplifiers thereby to activate the connected preamplifier therefrom, and switch means connected to said conductor at shore for effecting said momentary reversal of polarity of the potential thereon.

4. In a harbor defense system, a submarine conductor having shore-supplied B+ potential thereon, means for momentarily reversing the polarity of said potential on the said conductor, a hydrophone, a plurality of preamplifiers connected to said hydrophone, and polarity responsive switching means connected to said conductor for transferring connection of the conductor from one to another of said preamplifiers only when the polarity of said potential on the conductor is reversed.

5. In a harbor defense system, submarine conductor means having shore-supplied potential thereon, means for reversing the polarity of said potential, a hydrophone, a plurality of preamplifiers connected to said hydrophone and individually connectable to said conductor means, switch means for transferring connection of said conductor means from one to another of said preamplifiers as the switch means operates, and rectifier means interconnecting said conductor means and said switch means for operating the switch means when said polarity is reversed.

6. In a harbor defense system, submarine conductor means, shore-located amplifier means connectable to said conductor means and having a source of potential, two-position switch means interconnecting said amplifier means and said conductor means for applying positive polarity of said potential thereto in one position of the switch means and reversed polarity of the potential in the other position of the switch means, a pair of stepper switches having a coil, a wiper movable in steps as the coil is alternately energized and de-energized, and a plurality of contacts engageable by the wiper in sequence as the wiper is advanced step-by-step, a plurality of indicator lamps connected to the contacts of one of said stepper switches for indicating the position of the wiper thereof, a plurality of preamplifiers connected to the contacts of the other of the stepper switches, each wiper of the stepper switches being connected to said conductor means, a pair of rectifier means respectively interconnecting the conductor means and the coils of the stepper switches, said rectifier means being connected so as to present negligible resistance to energization of said coils by said potential when the potential is reversed, and a hydrophone connected to said preamplifiers whereby signals from the hydrophone are amplified by the preamplifier having positive polarity of said potential applied thereto from the conductor means by way of the wiper of said other of the stepper switches.

7. A shore operated sonar system comprising a grounded shore amplifier having B+ and B− output leads, a single conductor submarine cable, a reversible switch normally connecting the B+ output lead to one end of said conductor cable and the B− output lead to ground in one position of the switch and connected to reverse the potential on the cable in the other position of the switch, a ratchet relay connected on one side to ground, a rectifier interconnecting the other end of the cable and the other side of the relay in a manner to present negligible resistance to current flow to the relay when the potential on the cable is reversed by movement of the switch to said other position thereof, a hydrophone, grounded on one side, a pair of preamplifiers grounded at one side and having the signal input thereof connected to said hydrophone and power inputs connectable to said conductor cable, and switch means controlled by said relay for transferring connection of the preamplifiers with the conductor cable from one preamplifier to the other as the relay is operated.

8. A system of preamplifier exchange comprising a source of on-shore D. C. potential, means for operating one preamplifier of a sea unit on one polarity of said D. C. potential, means for maintaining another preamplifier of said sea unt in a standby condition for operation on said potential, on-shore means for reversing the polarity of said potential when said one preamplifier fails, and means included in said sea unit and operable only on the reversed polarity of said potential for transferring the potential to said standby preamplifier.

9. A system of preamplifier exchange comprising a source of on-shore D. C. potential, a plurality of submerged preamplifiers operable only on one polarity of said potential, off-shore means associated with said preamplifiers and operable only on reversed polarity of said potential for selectively transferring said potential to said preamplifiers in successive order in response to successive reversals of the polarity of said potential, and on-shore means for reversing the polarity of said potential at will.

10. A system of preamplifier exchange comprising a source of on-shore D. C. potential, a plurality of submerged preamplifiers operable only on one polarity of said potential, off-shore means associated with said preamplifiers and operable only on reversed polarity of said potential for selectively transferring said potential to said preamplifiers in successive order in response to successive reversals of the polarity of said potential, on-shore means for reversing the polarity of said potential at will, and on-shore means operable on said reversed polarity of potential for indicating the operated one of said preamplifiers following said reversals of polarity.

References Cited in the file of this patent
UNITED STATES PATENTS 1,901,185    Nelson  ---------------- Mar. 14, 1933